United States Patent
Behnecke

(10) Patent No.: US 12,168,875 B2
(45) Date of Patent: Dec. 17, 2024

(54) WALL SUPPORTING DEVICE

(71) Applicant: Illuminated Balustrade Australia Pty Ltd, Frankston (AU)

(72) Inventor: Mark Behnecke, Frankston (AU)

(73) Assignee: Illuminated Balustrade Australia Pty Ltd, Frankston South (AU)

( * ) Notice: Subject to any disclaimer, the term of this patent is extended or adjusted under 35 U.S.C. 154(b) by 257 days.

(21) Appl. No.: 17/440,232

(22) PCT Filed: Mar. 18, 2020

(86) PCT No.: PCT/AU2020/050255
§ 371 (c)(1),
(2) Date: Sep. 17, 2021

(87) PCT Pub. No.: WO2020/186301
PCT Pub. Date: Sep. 24, 2020

(65) Prior Publication Data
US 2022/0170271 A1 Jun. 2, 2022

(30) Foreign Application Priority Data
Mar. 18, 2019 (AU) ................. 2019900886

(51) Int. Cl.
*E04F 11/18* (2006.01)
*F21V 33/00* (2006.01)

(52) U.S. Cl.
CPC ...... *E04F 11/1812* (2013.01); *E04F 11/1853* (2013.01); *F21V 33/006* (2013.01);
(Continued)

(58) Field of Classification Search
CPC ............. E04F 11/1853; E04F 11/1812; E04F 11/1851; E04H 17/168; F21V 33/006
See application file for complete search history.

(56) References Cited

U.S. PATENT DOCUMENTS 4,059,321 A * 11/1977 Rasmussen ............ H02G 3/185
439/131
7,105,745 B2 * 9/2006 Drane ..................... H02G 3/14
174/67
(Continued)

FOREIGN PATENT DOCUMENTS

| AU | 2003227100 B2 | 11/2003 |
|---|---|---|
| AU | 2014328827 B2 | 4/2015 |

(Continued)

OTHER PUBLICATIONS

International Search Report for Application No. PCT/AU2020/050255 dated Apr. 24, 2020, 2 pages.
(Continued)

*Primary Examiner* — Brian E Glessner
*Assistant Examiner* — Daniel J Kenny
(74) *Attorney, Agent, or Firm* — Howard & Howard Attorneys PLLC

(57) ABSTRACT

A wall supporting device, for supporting a wall segment, has a base portion, above which the wall segment is locatable. The base portion is for receiving a lighting device, and has a top surface on which a portion of the lighting device is restable. The device also has an arm portion, extending from the base portion, to which the wall segment is securable. A gap is defined between the portion of the lighting device resting on the top surface and a side surface of the device.

14 Claims, 1 Drawing Sheet

(52) U.S. Cl.
CPC ............. *E04F 2011/1872* (2013.01); *E04F 2011/1895* (2013.01)

(56) References Cited

U.S. PATENT DOCUMENTS

| | | | |
|---|---|---|---|
| 10,184,267 B2 * | 1/2019 | Kuo | E04F 11/1812 |
| D909,193 S * | 2/2021 | Canavarro | A47G 5/00 |
| | | | D8/394 |
| D934,450 S * | 10/2021 | Giacometti | D25/38.1 |
| 11,459,766 B2 * | 10/2022 | Seeboth | E04F 11/1846 |
| 2015/0043965 A1 * | 2/2015 | Mao-Cheia | F16B 5/06 |
| | | | 403/338 |
| 2018/0002949 A1 | 1/2018 | Kuo et al. | |
| 2018/0135669 A1 * | 5/2018 | Dagand | F16B 2/14 |
| 2021/0017787 A1 * | 1/2021 | Budai | E04F 11/1817 |
| 2021/0172178 A1 * | 6/2021 | Seeboth | E04B 2/7401 |

FOREIGN PATENT DOCUMENTS

| | | |
|---|---|---|
| AU | 20214328827 B2 | 4/2015 |
| EP | 2905395 A1 | 8/2015 |
| EP | 3009580 A1 | 4/2016 |
| EP | 3 680 440 A1 | 7/2020 |
| ES | 2 582 000 A1 | 9/2016 |
| WO | 2016193806 A1 | 12/2016 |
| WO | 2018141018 A1 | 8/2018 |

OTHER PUBLICATIONS

Supplementary European Search Report, Application No./Patent No. 20772532.6—1201/3942120 PCT/2020050255, 13 pages, Date of completion of the search—May 22, 2023.

* cited by examiner

WALL SUPPORTING DEVICE

CROSS REFERENCE TO RELATED APPLICATIONS

This application is the National Stage of International Application No. PCT/AU2020/050255 filed on Mar. 18, 2020, which claims priority from Australian Application No. 2019900886 filed on Mar. 18, 2019. The entire contents of these applications are incorporated herein by reference in their entirety.

FIELD OF THE INVENTION

The invention relates to a wall supporting device. Preferred embodiments of the present invention relate to a supporting device for a transparent or translucent wall. The wall may, for example, be a glass wall or an acrylic wall.

BACKGROUND

Some existing devices for supporting a glass wall above ground have an aperture in which a lighting device can be housed for illuminating the wall. These existing devices do not allow for the lighting device to be removed therefrom. If the lighting device is damaged, for example in wet conditions where water would accumulate on the lighting device, or is simply desired to be replaced, the entire supporting device would need to be replaced with a new supporting device.

In this context, there is a need for a wall supporting device that allows for the lighting device to be removed, and/or a need for a water supporting device be less prone to damage in water conditions, and/or to provide the public with a useful choice.

SUMMARY OF THE INVENTION

In one aspect, the present invention provides a wall supporting device locatable in a ground, the wall supporting device for removably receiving a lighting device when the wall supporting device is located in the ground.

According to this aspect of the present invention, a lighting device can be removed from the wall supporting device while the wall supporting device is located in the ground. Additionally, a lighting device can be installed in the wall supporting device while the wall supporting device is located in the ground. The lighting device can be removed from or installed into the wall supporting device without having to replace the wall supporting device and without having to remove the wall supporting device from the ground.

In another aspect, the present invention provides a wall supporting device for supporting a wall segment, the wall supporting device including: a base portion, above which the wall segment is locatable, the base portion for receiving a lighting device, the base portion having a top surface on which a portion of the lighting device is restable; an arm portion, extending from the base portion, to which the wall segment is securable; and a side surface, wherein a gap is defined between the portion of the lighting device resting on the top surface and the side surface.

The base portion preferably includes the side surface. The base portion may have an aperture for the lighting device, the side surface being of a wall of the aperture such that, when the lighting device is located in the aperture, the gap is between the lighting device and the wall of the aperture.

The wall preferably has a height that is at least equal to a head portion of the lighting device. The base portion preferably includes a recessed area for the lighting device, wherein the recessed area has the top surface and the side surface.

Alternatively, the arm portion includes the side surface. For example, in this arrangement, the head of the lighting device is sandwiched between the top surface of the base portion and a bottom surface of the wall segment.

The lighting device can be removed from the base portion by inserting an implement into the gap and prying the lighting device from the base portion. Any water than accumulates on the lighting device when received by the base portion would drain towards the gap.

The base portion and arm portion are integrally formed as one-piece.

The wall supporting device may include two arm portion portions extending from the base portion with the wall segment removably locatable therebetween.

The base portion may include a channel, and the wall surface at least partially defines the channel. The base portion may include more than one channel with the base portion having more than one wall surface, each wall surface defining a respective one of the channels such that there is more than one gap when the lighting device is received by the base portion. By way of example, the base portion may have two channels. In other examples, the aperture has three channels, four channels, or five or more channels. The channels are preferably evenly spaced apart from each other around a central axis through the aperture. In other embodiments, the channels may be irregularly spaced apart from each other about the central axis. The channel may be tapered such that a cross-section of the channel is largest at an uppermost surface of the base portion. Alternatively, the channel may be tapered such that a cross-section of the channel is smallest at a top surface of the base portion.

At the uppermost surface of the base portion, the channel has a width that corresponds to 15% to 20% of a width of a head of the lighting device. The width of the channel is preferably about 16 to 18% of the width of the head of the lighting device.

The wall supporting device preferably includes a sloped portion between an upper surface of the base portion and a side surface of the arm portion, the sloped portion defining a smooth transition from the base portion to the arm portion.

In another aspect, there is provided a wall supporting device for supporting a wall segment, the wall supporting device including: a base portion, above which the wall segment is locatable, the base portion for receiving a lighting device; an arm portion, extending from the base portion, to which the wall segment is securable; and a sloped portion between an upper surface of the base portion and a side surface of the arm portion, the sloped portion defining a smooth transition from the base portion to the arm portion.

The wall supporting device of this aspect may include features of the wall supporting device of the previously described aspect.

The sloped portion may have a rounded surface. The sloped portion may alternative have a flat surface.

The wall supporting device may further include the lighting device. The lighting device may include a light-emitting diode (LED) for example.

BRIEF DESCRIPTION OF THE DRAWINGS

The invention will now be described, by way of non-limiting example only, with reference to the accompanying drawings, in which.

DETAILED DESCRIPTION

Figure 1A:
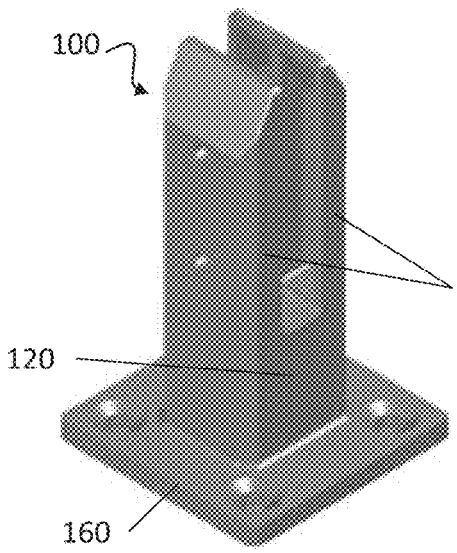
FIG. 1A is a perspective view of the wall supporting device according to an embodiment of the present invention.
Figure 1B:
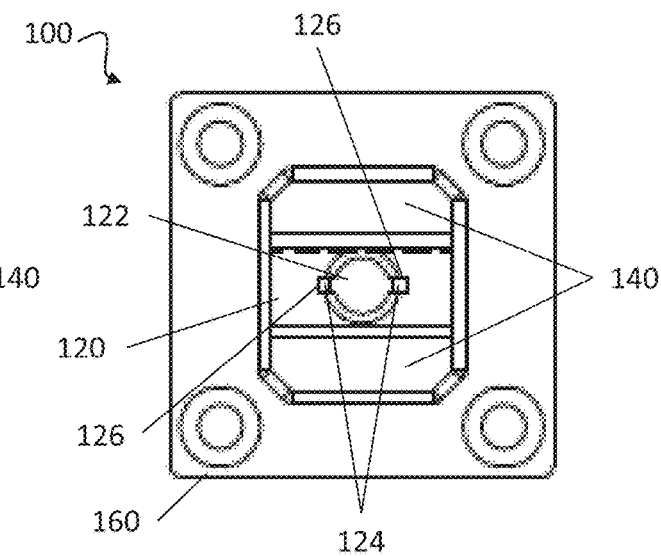
FIG. 1B shows a top view of the wall supporting device shown in FIG. 1A.
Figure 1C:
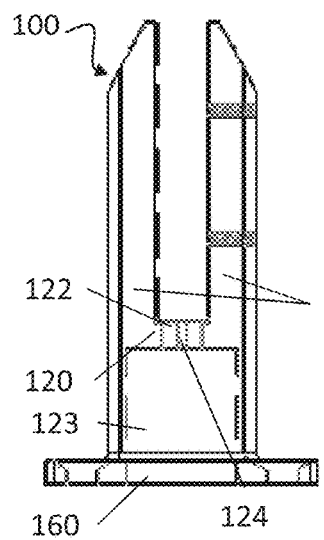
FIG. 1C shows a sections side view of the wall supporting device shown in FIG. 1A.
Figure 1D:
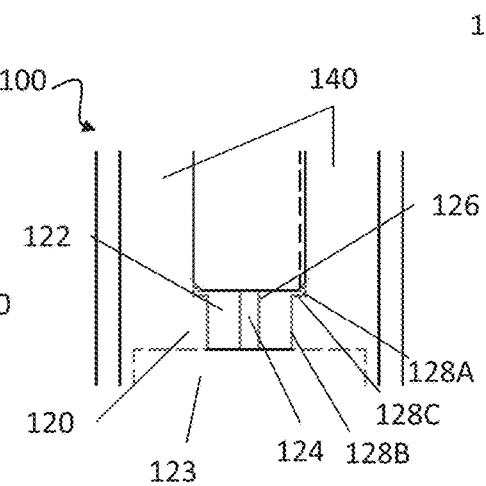
FIG. 1D shows a detailed sectional view of a portion of the wall supporting device shown in FIG. 1A.
Figure 1E:
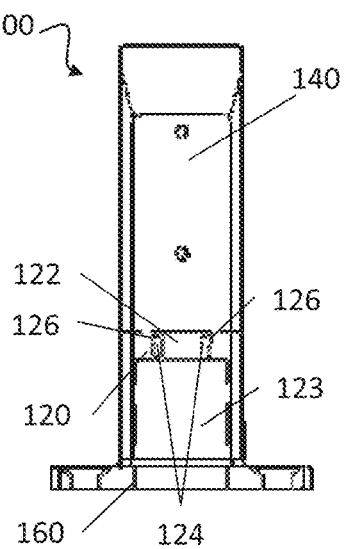
FIG. 1E shows a sectional front view of the wall supporting device shown in FIG. 1A.

FIGS. 1A to 1F illustrate a wall supporting device 100 (also referred to as a spigot or pod) according to an embodiment of the present invention. The wall supporting device 100 is for supporting a wall segment, such as a transparent or translucent wall, above ground. The wall may, for example, be a glass wall or an acrylic wall. The wall supporting device 100 contains a lighting device for illuminating the wall segment. The lighting device preferably includes a light emitting diode (LED).

The device 100 has a base portion 120, two arm portions 140, and a flange portion (or skit portion) 160. The base portion 120, arm portions 140, and flange portion 160 are integrally formed as one-piece. The wall supporting device is made from stainless steel. For example, the device is made from 2205 stainless steel, 304 stainless steel, or 316 stainless steel. In other embodiments, the device may be made from cast iron, other metal, or plastic. In other embodiments, the wall supporting device may not have the flange portion.

The base portion 120 has an aperture 122 for a lighting device. When the lighting device is located in the aperture 122, there are gaps 124 between wall surfaces of the aperture and the lighting device. In the embodiment shown in FIGS. 1A to 1E, there are two gaps 124 between the lighting device (when located in the aperture) and wall surfaces of the aperture. In other embodiments, there may be one gap between the lighting device and a wall surface of the aperture, or more than two gaps. The aperture has a depth of up to about 20 mm, preferably about 10 mm. The aperture has a width (or diameter) of up to about 25 mm, preferably about 20 mm. The wall surface of the aperture that defines a boundary of one of the gaps is a portion of the wall of the aperture and is straight wall. The wall surface is parallel to a tangent to the lighting device located in the aperture. In other examples, the wall surface of the aperture may be a curved wall.

The gaps 124 allow for the lighting device to be removed from the aperture without having to remove the wall supporting device from the ground. In particular, the lighting device can be removed from the wall supporting device by inserting an implement into the gap and prying the lighting device from the aperture.

The gaps 124 also provide drainage for the wall supporting device 100. With existing wall supporting devices, during wet or rainy conditions for example, water would accumulate on the lighting device that can affect the illumination effect provided by the lighting device to the wall segment, and that can potentially damage the lighting device. The gaps 124A, 124B provides a passage for water or moisture away from the lighting device 100.

The base portion 120 has two channels 126 on opposite sides of the aperture that provide the gaps 124. In particular, each gap 124 is provided between the lighting device and a wall surface of the aperture that at least partially defines a respective one of the channels 126. In other embodiments, the aperture has one channel, three channels, four channels, or five or more channels. The channels are evenly spaced apart from each other around a central axis through the aperture. In other embodiments, the channels may be irregularly spaced apart from each other about the central axis.

The channel 126 is tapered such that a cross-section of the channel is largest at the uppermost surface of the base portion 102. Alternatively, the channel may be tapered such that a cross-section of the channel is smallest at a top surface of the base portion. At the uppermost surface of the base portion, the channel preferably has a width that corresponds to 15% to 20% of a width of the head of the lighting device. The width of the channel is preferably about 16 to 18% of the width of the head of the lighting device. The channel has a width of up to about 5 mm, preferably about 3 mm. The channel has a depth that is equal to the depth of the aperture. In other embodiments, the channel extends only partially into the aperture. A cross-sectional profile of the channel is constant along the depth of the aperture. In other embodiments, the cross-sectional provide of the channel may vary along the depth of the aperture.

In other embodiments, instead of the gap(s) being provided by channel(s) or in addition to the channel(s) being present, the aperture may be shaped or configured in some other way to provide the gap(s) between the lighting device and wall surface.

By way of example, a cross-section of the aperture may be substantially oval such that, when the lighting device is provided in the aperture, the gaps are provided at the narrower sections of the aperture.

By way of another example, a cross-section of the aperture may be substantially square or rectangular such that, when the lighting device is provided in the aperture, the gaps are provided at the corners of the aperture.

By way of yet another example, a cross-section of the aperture may be substantially triangular, trapezoidal, or other polygonal shape such that, when the lighting device is provided in the aperture, the gaps are provided at the corners of the aperture.

By way of a further example, a cross-section of the aperture may be substantially circular having a diameter that is larger than a width dimension of the lighting device such that, when the lighting device is provided in the aperture, the gap is provided around the lighting device.

By way of yet a further example, the wall surface may be of the arm portion such that, when the lighting device is provided in the base portion, there is a gap between the lighting device and the arm portion. In this example, a bottom surface of the wall segment may rest on the head portion of the lighting device.

The aperture 122 has an upper section 128A and a lower section 128B defining a recessed area in the base portion.

The upper section 128A is dimensioned to receive the head portion of the lighting device. The upper section 128A has a larger cross-section than a cross section of the lower section to define a step 128C within the aperture 122 with a wall of the upper section defining a wall surface. The step provides a top surface on which a portion of the lighting device is restable such that when the portion of the lighting device rests on the top surface, the gap is provided between the portion of the lighting device and the wall surface. A depth of the upper section 128A of the aperture is preferably up to 20% of an overall depth of the aperture. Preferably, the depth of the upper section 128A is about 10% of the depth of the aperture. The depth of the upper section 128A is about 1 mm.

The lower section 128B is dimensioned for the rest of the lighting device. The lower section has a depth of about 9 mm.

The two arm portions 140 extend upwardly from the base portion 120. The arm portions 140 are spaced apart from each other to receive a wall segment therebetween, on the base portion 120. The arm portions 140 are spaced apart from each other by a distance corresponding to a thickness of the wall segment. For example, the arm portions are spaced apart from each other by between about 10 mm to about 30 mm inclusive. Preferably, the arm portions are spaced apart from each other by about 19 mm. When the wall segment is provided in the wall supporting device 100, there is a gap of up to about 1 mm between a surface of the wall segment and a respective one of the arm portions 140. In other embodiments, there is no gap between the surface of the wall segment and the respective arm portion 140. The arm portions 140 are configured or arranged to receive a fastener to secure the wall segment to the wall supporting device 100. In particular, the fastener passes through a first one of the arm portions 140, through the wall segment, and into the second one of the arm portions 140 to thereby secure the wall segment. One of the arms has two spaced apart threaded holes for receiving a respective fastener to secure the wall segment.

Figure 1F:
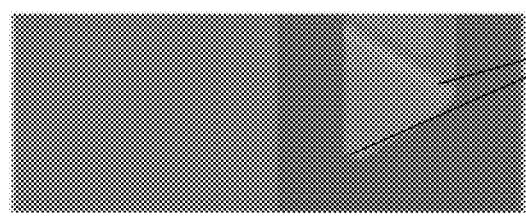
FIG. 1F shows a close-up perspective view of part of the wall supporting device shown in FIG. 1A.

The wall supporting device 100 includes sloped portions 180, shown in FIG. 1F, between an upper surface of the base portion 120 and a side surface of each arm portion 140. Each sloped portion defines a smooth transition from the base portion to the arm portion. The sloped portion is for strengthening the device 100. Each sloped portion 180 has a rounded surface. In other embodiments, the sloped portion has a flat surface. The sloped portion 180 is provided where the arm portion 140 meets the base portion 120.

The flange portion 160 extends from the base portion 120 and surrounds the base portion 120. A cross-section of the flange portion 160 is substantially square shape with the base portion centrally located thereto. The flange portion 160 has mounting holes at corners of the flange portion for securing the wall supporting device 100 to the ground. For example, the wall supporting device 100 is screwed or bolted about the flange portion 160 to the ground. In other embodiments as mentioned above, the wall supporting device may not include a flange portion. These types of wall supporting devices are typically located in a ground slab during fabrication of the ground slab.

Below the aperture 122, there is a chamber 123 for storing electronics or electrical cables for powering the lighting device. The chamber 123 is provided to reduce manufacturing costs of the device. In some embodiments, for example—in embodiments of the wall supporting devices without flange portions as described above, the chamber 123 may include one or more passages for receiving an electrical cable, for example to or from another wall supporting device, for powering the lighting device. The other wall supporting device may be a neighboring wall supporting device.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

Throughout this specification and the claims which follow, unless the context requires otherwise, the word 'comprise', and variations such as 'comprises' and 'comprising', will be understood to imply the inclusion of a stated integer or step or group of integers or steps but not the exclusion of any other integer or step or group of integers or steps.

What is claimed is:

1. A wall supporting device for supporting a wall segment, the wall supporting device comprising:
    a base portion, above which the wall segment is locatable, the base portion comprising:
        a top surface on which a portion of a lighting device is restable; and
        an aperture in the top surface and configured for receiving the lighting device; and
    an arm portion, extending from the base portion, to which the wall segment is securable;
    wherein:
    the aperture is configured to provide, when the lighting device is received therein, at least one gap between the lighting device and a wall of the aperture, said at least one gap being open at the top surface; and
    the base portion further comprises at least one channel that extends vertically downwards into the base portion and is configured such that each of the at least one channel at least partially defines one of the at least one gap, and wherein each of the at least one channel is configured to provide a water-drainage path for directing water away from the lighting device when the lighting device is received by the aperture.

2. The wall supporting device of claim 1, wherein the wall of the aperture has a height that is at least equal to a head portion of the lighting device.

3. The wall supporting device of claim 1, wherein the base portion and arm portion are integrally formed as one-piece.

4. The wall supporting device of claim 1, wherein the at least one channel is tapered such that a cross-section of said channel is largest at an uppermost surface of the base portion.

5. The wall supporting device of claim 3, wherein at an uppermost surface of the base portion, the channel has a width that corresponds to 15% to 20% of a width of a head of the lighting device.

6. The wall supporting device of claim 3, wherein the wall supporting device includes a sloped portion between an upper surface of the base portion and a side surface of the arm portion, the sloped portion defining a smooth transition from the base portion to the arm portion.

7. The wall supporting device of claim 6, wherein the sloped portion has a rounded surface.

8. The wall supporting device of claim 6, wherein the sloped portion has a flat surface.

9. The wall supporting device of claim 1, further including the lighting device.

10. The wall supporting device of claim 1, wherein the gap is configured for insertion of an implement therein to remove the lighting device from the base portion by using the inserted implement to pry the lighting device from the base portion.

11. The wall supporting device of claim 1, wherein the aperture comprises an upper section and a lower section, the lower section defining a recessed area in the base portion and the upper section configured to receive a head portion of the lighting device.

12. The wall supporting device of claim 11, wherein the upper section has a depth of about 10% to 20% of an overall depth of the aperture.

13. The wall supporting device of claim 11, wherein the upper section has a depth of about 1 mm.

14. The wall supporting device of claim 11, wherein the lower section has a depth of about 9 mm.

* * * * *